United States Patent [19]

Isbrandt

[11] Patent Number: 4,482,608

[45] Date of Patent: Nov. 13, 1984

[54] RELEASE COATING FOR INFRARED IMAGEABLE AND THERMALLY IMAGEABLE FILMS

[75] Inventors: Russell R. Isbrandt; Robert D. Lowery, both of St. Paul, Minn.

[73] Assignee: Minnesota Mining and Manufacturing Company, Saint Paul, Minn.

[21] Appl. No.: 401,842

[22] Filed: Jul. 26, 1982

[51] Int. Cl.$^3$ ........................ B32B 27/00; B32B 27/28; G03C 5/16

[52] U.S. Cl. .................................... 428/421; 428/913; 430/4; 430/9; 430/13; 430/200; 430/211; 430/907; 430/944

[58] Field of Search ............... 428/421, 262, 341, 913, 428/195; 560/115; 260/29.6 F, 399; 526/245, 246, 243; 430/47, 9, 13, 4, 944, 907, 200, 211; 149/19.1

[56] References Cited

U.S. PATENT DOCUMENTS

| | | | |
|---|---|---|---|
| 2,642,416 | 6/1953 | Ahlbrecht et al. | 526/245 |
| 2,803,615 | 8/1957 | Ahlbrecht et al. | 260/29.6 F |
| 2,826,564 | 3/1958 | Bovey et al. | 526/246 |
| 3,102,103 | 8/1963 | Ahlbrecht et al. | 260/29.6 F |
| 3,278,352 | 10/1966 | Erickson | 149/19.1 |
| 3,318,852 | 5/1967 | Dixon | 428/341 |
| 3,445,491 | 5/1969 | Pacini | 260/399 |
| 3,470,124 | 9/1969 | Van Eygen et al. | 260/29.6 F |
| 3,854,942 | 12/1974 | Akman | 430/47 |
| 3,944,527 | 3/1976 | McCown | 526/243 |
| 3,995,085 | 11/1976 | McCown | 428/262 |
| 4,171,397 | 10/1979 | Morrow | 428/195 |
| 4,321,404 | 3/1982 | Williams et al. | 560/115 |

FOREIGN PATENT DOCUMENTS

| | | | |
|---|---|---|---|
| 1477409 | 9/1974 | United Kingdom | 430/944 |

*Primary Examiner*—T. J. Herbert

*Attorney, Agent, or Firm*—Donald M. Sell; James A. Smith; David L. Weinstein

[57] ABSTRACT

Coating for infrared transparency films and thermally imageable films and films prepared with such coating. The coating comprises a copolymer formed from (a) at least one fluorocarbon monomer and (b) at least one monomer which imparts hardness to the copolymer. The coating serves to prevent the transfer of toner powder from an original which is in actuality an electrophotographic copy to the transparency film. The copolymer may contain from about 12 percent to about 85 percent fluorocarbon monomer, the remainder being the monomer which imparts hardness to the coating. Suitable monomers for imparting hardness to the copolymer include acrylates, methacrylates, acrylamides, methacrylamides, acrylonitriles, methacrylonitriles, and styrenes.

8 Claims, No Drawings

RELEASE COATING FOR INFRARED IMAGEABLE AND THERMALLY IMAGEABLE FILMS

BACKGROUND OF THE INVENTION

This invention relates to infrared transparency films and films for thermal imaging processes, and in particular, to a coating material for such films.

Infrared imaging involves the use of a focused infrared lamp to heat an infrared absorbing image, commonly referred to as the "original", which image is in contact with a substrate, i.e. a transparency film, having thermally sensitive imaging chemicals. Upon absorbing the focused infrared light, the infrared absorbing image heats the thermally sensitive imaging chemicals on the substrate, causing a chemical reaction, resulting in a copy of the original image on the substrate.

It is frequently desirable to prepare projection transparencies from originals which are actually plain paper copies prepared from electrophotographic imaging processes. Because the localized heating of the image results in partial remelting of the toner powder on the original, the original frequently adheres to the transparency film. When the original is separated from the transparency film, toner powder from the original is transferred to the transparency film. This transfer of toner powder reduces the density of the image on the original and may destroy the quality of the image. Thus, the original can be damaged when a transparency is made from it. The adherence of the toner powder to the transparency film may also result in undesirable effects in the transparency. When the image on the transparency film is black, the toner powder does not harm the image itself, but the powder may rub off the transparency film or transfer to surfaces coming in contact with the transparency film. When the image on the transparency film is a color, the toner causes the image to have irregular black spots in the colored image area. This is a major defect in the transparency.

A barrier film interposed between the transparency film and the original can prevent toner powder from being picked up and retained by the transparency. In a common color transparency, a film containing an acid does serve as such a barrier.

Coatings that are capable of preventing unwanted materials from adhering to a surface are known. McCown, U.S. Pat. Nos. 3,995,085 and 3,944,527 disclose hybrid copolymers consisting essentially of fluoroaliphatic radical containing acrylates or methacrylates, lower alkyl acrylates or methacrylates, and at least two polyalkyleneoxide acrylates and methacrylates. These hybrid copolymers are useful for treatment of fabrics and provide an improved balance of properties. They provide stain repellancy and soil release, with good resistance to crocking.

A matte finish surface incorporating fine particles of inorganic materials such as silica, magnesium oxide, titanium dioxide, or calcium carbonate, or organic materials such as polymethyl methacrylate or cellulose acetate propionate has been used to reduce adhesion (See Akman, U.S. Pat. No. 3,854,942.)

Another method for reducing adhesion to a photographic, hydrophilic surface is disclosed in British Patent Specification No. 1,477,409, assigned to Fuji Photo Film Co. Ltd. This reference discloses a process of surface treatment of a hydrophilic surface layer of a photographic element which process comprises applying a liquid comprising at least one organic fluoro compound thereto, wherein the liquid contains no film-forming polymer. This process improves the anti-adhesive property of a photographic element.

Another method is disclosed in Williams, et al, U.S. Pat. No. 4,321,404, in which a radiation curable adhesive coating composition comprising a polyfluorinated acrylate compound, a polyethylenically unsaturated crosslinking agent, and a film-forming organic polymer is applied to image transfer systems.

None of the foregoing disclosures are adaptable to the area of production of projection transparencies from plain paper copies.

Polymers useful for textile treatment, e.g. a copolymer of $C_8F_{17}SO_2N(C_2H_5)C_2H_4O_2C(CH_3)=CH_2$ and tetraethylene glycol dimethacrylate-hydrogen sulfide prepolymer prepared in accordance with the method of Erickson, U.S. Pat. No. 3,278,352, Example I, should be soft and have shear modulus of under $10^7$ dynes/cm$^2$. These polymers, when coated upon a transparency film substrate, do not release toner powder completely. To be useful for transparency films, polymers should have a shear modulus over $10^7$ dynes/cm$^2$. Sward hardness over 40, and preferably over 50, is necessary in order to have such modulus values and to release toner powder while maintaining a smooth, non-light scattering surface. Moreover, polymers useful for textile treatment are in the form of latices and do not coat smoothly at the low coating weights needed for transparency films.

Matte surface films are undesirable for projection transparencies because matte surfaces scatter light, consequently reducing the light reaching the screen. This reduction of light is detrimental to the quality of the projected image. Thus, the use of silica or other particles in a transparency coating detracts from the quality of the transparency.

The fluorochemical liquids disclosed in British Patent Specification No. 1,477,409 are unsuitable for coating transparencies because they migrate to the surface of the film and result in a greasy, low molecular weight film on the surface of the transparency. When they are applied directly to the surface of the transparency film, they are easily removed and smudged by handling.

Williams, U.S. Pat. No. 4,321,404 discloses a process in which monomers are applied to surfaces and cured with radiation to form polymers. Because the transparency films have coatings which are sensitive to high energy radiation, i.e. infrared, high energy ultraviolet, electron beams, such curing causes premature darkening of the films as the monomers are curing. If the monomers are polymerized before being applied to the transparency film, they become insoluble and cannot be coated from solutions.

It is an object of the present invention to provide an infrared transparency film and thermally imageable film which can be used to copy plain paper copies while repelling toner powder from the plain paper copies.

It is another object to provide a coating for infrared transparency film or thermally imageable film which prevents toner powder from plain paper copies from adhering to the film.

It is a further object to provide a coating for infrared transparency film or thermally imageable film which does not interfere with the chemicals in the thermally imageable layer.

SUMMARY OF THE INVENTION

This invention involves a coating material for infrared transparency films and thermally imageable films and films prepared with such coating material. The coating comprises a copolymer formed from (a) at least one fluorocarbon monomer and (b) at least one monomer which imparts hardness to the copolymer. The fluorocarbon monomer may comprise from about 12 percent to about 85 percent by weight of the copolymer. The fluorocarbon monomer is a fluoroaliphatic radical containing acrylate or methacrylate. The monomer which imparts hardness to the copolymer may be selected from styrenes, acrylonitriles, acrylamides, methacrylonitriles, methacrylamides, acrylates, and methacrylates. This monomer may comprise from about 15 to about 88 percent by weight of the copolymer. The coating prevents the transfer of toner powder from a plain paper copy, which is serving as an original, to the infrared transparency film or thermally imageable film upon which the coating is applied.

DETAILED DESCRIPTION

The type of transparency film contemplated for use with the coating of the present invention is any infrared imageable film or thermally imageable film which is imaged by coming in direct contact with an original.

A particularly appropriate type of infrared transparency film contemplated for use with the present invention is described in Isbrandt, et al, U.S. patent application No. 352,053, filed Feb. 24, 1982. This transparency film is essentially a polymeric film substrate which bears an imageable layer on at least one surface thereof. Suitable substrate materials include polycarbonates, polyesters, polyacrylates, polystyrene, and polypropylene. A preferred substrate is polyvinylidene chloride primed polyester film. The imageable layer comprises a nitrate salt, at least one leuco dye, and a binder. A particularly preferred imageable layer may be prepared by coating the formulation set forth below onto a 4 mil polyvinylidene chloride primed polyethylene terephthalate film and allowing it to dry for three (3) minutes at 120° F.:

| IMAGEABLE LAYER FORMULATION | |
|---|---|
| Nickel nitrate | 0.0582 g |
| 3,7-Di(N,N—diethylamino)-10-benzoyl phenoxazine* | 0.0859 g |
| Phthalic acid | 0.0500 g |
| 1-Phenyl-3-Pyrazolidinone | 0.0050 g |
| Catechol | 0.0136 g |
| Cellulose acetate butyrate | 1.5000 g |
| Ethanol | 1.7500 g |
| Tetrahydrofuran | 1.2500 g |
| Acetone | 7.2250 g |
| Methylisobutyl ketone | 1.2750 g |

*This is available commercially as Pergascript Turquoise S-2G from Ciba-Geigy.

The infrared imageable film requires a low surface energy coating made of a copolymer formed from (a) at least one fluorocarbon monomer, and (b) at least one monomer which imparts hardness to the copolymer.

The fluorocarbon monomers are termed fluoroaliphatic vinyl monomers, fluoroaliphatic acrylates, or fluoroaliphatic methacrylates. The monomer should contain at least 7 percent by weight fluorine in the form of fluoroaliphatic radicals and preferably at least 30 percent and up to as much as 55 percent. The monomer must contain at least one fluoroaliphatic radical terminating in a $CF_3$ group. The fluoroaliphatic radical should contain at least three fully fluorinated carbon atoms which may or may not contain the terminal $CF_3$. A perfluoroalkyl group, $C_nF_{2n+1}$, is preferred where n is 3 to 20.

The fluoroaliphatic radical is a fluorinated, saturated, monovalent, non-aromatic aliphatic radical of at least 3 carbon atoms. The chain may be straight, branched, or, if sufficiently large, cyclic, and may be interrupted by divalent oxygen atoms or trivalent nitrogen atoms bonded only to carbon atoms. A fully fluorinated group devoid of hydrogen atoms is preferred, but hydrogen or chlorine atoms may be present as substituents in the fluorinated aliphatic radical provided that not more than one atom of either is present in the radical for every two carbon atoms, and that the radical must at least contain a terminal perfluoromethyl group. Preferably the fluoroaliphatic radical contains not more than 20 carbon atoms because such a large radical results in inefficient use of the fluorine content. More preferably, the fluoroaliphatic radical should contain no more than 14 carbon atoms. Most preferably, the fluoroaliphatic radical should contain from about 6 to 10 carbon atoms. Suitable fluoroaliphatic radical-containing acrylate monomers include:

$(C_3F_7)_3CCH_2O_2CCH{=}CH_2$
$C_3F_7SO_2N(C_3H_7)C_2H_4O_2CC(CH_3){=}CH_2$
$C_8F_{17}(CH_2)_3O_2CCH{=}CH_2$
$C_8F_{17}COCH_2CH_2CH_2O_2CCH{=}CH_2$
$C_8F_{17}(CH_2)_{11}O_2CC(CH_3){=}CH_2$
$C_8F_{17}SO_2CH_2CH_2O_2CCH{=}CH_2$
$C_8F_{17}SOCH_2CH_2O_2CCH{=}CH_2$
$C_8F_{17}SO_2N(C_2H_5)(CH_2)_2O_2CC(CH_3){=}CH_2$
$C_{12}F_{25}SO_2NH(CH_2)_{11}O_2CC(CH_3){=}CH_2$
$CF_3C(CF_2H)F(CF_2)_{10}CH_2O_2CCH{=}CH_2$
$CF_3C(CF_2Cl)F(CF_2)_{10}(CH_2)_2O_2CCH{=}CH_2$
$C_8F_{17}SO_2N(CH_3)CH_2O_2CC(CH_3){=}CH_2$
$C_2F_5(OCF_2CF_2)_6OCF_2CF_2CON(CH_3)CH_2CH_2O_2CCH{=}CH_2$
$(C_4F_9CO)_2NCH_2CH_2O_2CC(CH_3){=}CH_2$

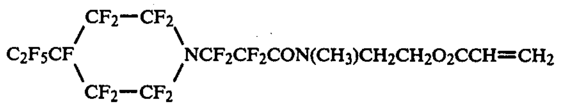

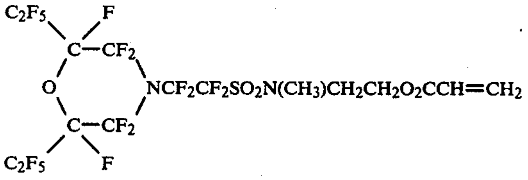

Suitable fluoroaliphatic radical containing acrylate or methacrylate monomers may be represented by the formula:

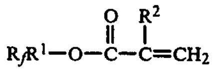

wherein $R_f$ is a perfluoroalkyl group containing 3 to 20 carbon atoms, $R^1$ is an alkylene bridging group containing 1 to 16 carbon atoms, and $R^2$ is —H or —$CH_3$.

$R^1$ is an organic divalent radical or connecting group of 1 to 16 carbon atoms which can contain catenary oxygen or sulfur atoms, and groups such as carboxamido, sulfonamido, imino, carbonyl, etc., and is unsubstituted or substituted by halogen, hydroxyl, alkyl, or aryl groups, and is preferably free of aliphatic unsaturation. Examples of such divalent radicals may include one or more of the following:

—$CH_2$—, —$C_2H_4$—, —$C_4H_8$—, —$C_6H_4$—, —$C_2H_4SC_2H_4$—, —$C_2H_4OC_4H_8$—, —$SO_2N(R^3)C_2H_4$—, —$CON(R^3)C_2H_4$—, —$C_3H_6CON(R^3)C_2H_4$—, —$C_2H_4N(R^3)C_2H_4$—, —$C_2H_4SO_2N(R^3)C_4H_8$— where $R^3$ is hydrogen or alkyl group containing one to six carbon atoms. A particularly preferred divalent radical is represented by the formula:

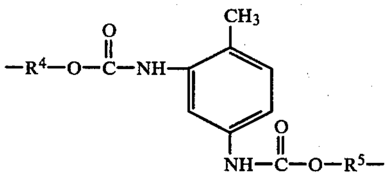

where $R^4$ is —$C_nH_{2n}$— and n=2 or 3, $R^5$ is —$C_nH_{2n}$— and n=2 or 3.

A preferred fluoroaliphatic radical containing acrylate or methacrylate monomers may be represented by the general formula:

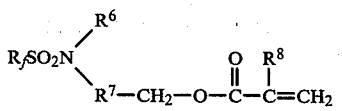

wherein $R_f$ is a perfluoroalkyl group containing 3 to 20 carbon atoms, $R^6$ is an alkyl side group containing 1 to 6 carbon atoms, $R^7$ is an alkylene bridging group containing 1 to 16 carbon atoms, and $R^8$ is —H or —$CH_3$.

The copolymer should contain from about 12 to about 88 percent by weight fluorocarbon monomer and preferably contain about 30 to about 50 percent fluorocarbon monomer. Most preferred are those copolymers having a fluorocarbon monomer content of about 40 percent.

Methods for preparing suitable fluorocarbon monomers are disclosed in U.S. Pat. Nos. 2,642,416; 2,803,615; 3,102,103. These patents are incorporated herein by reference.

The monomer which imparts hardness to the copolymer must form polymers with glass transition temperatures in excess of about 80° C. Suitable hardness imparting monomers include styrene, methyl styrene, acrylonitrile, methacrylonitrile, acrylamide, methacrylamide, methyl methacrylate, ethyl methacrylate, and methyl acrylate. The preferred monomers include methyl methacrylate, styrene, acrylonitrile, and methacrylonitrile. Most preferred are styrene and methyl methacrylate. Acrylates such as butyl acrylate and longer-chain alkyl acrylates, methacrylates such as butyl methacrylate, or longer-chain alkyl methacrylates are not suitable as hardness imparting monomers because they produce softness in the copolymer. Suitable hardness imparting monomers which are commercially available include styrene (Aldrich S 497-2), α-methyl styrene (Aldrich M 8090-3), β-methyl styrene (Aldrich M 8100-4), acrylonitrile (Aldrich 11,021-3), methacrylonitrile (Aldrich 19,541-3), acrylamide (Aldrich 14,866-0), methacrylamide (Aldrich 10,960-6), methyl methacrylate (Aldrich M 5590-9), ethyl methacrylate (Polysciences 2323), and methyl acrylate (Aldrich M 2730-1). The hardness imparting comonomer should have a suitable monomer reactivity ratio to copolymerize readily with fluoroalkyl acrylates and fluoroalkyl methacrylates.

The copolymers of this invention are generally prepared using emulsion, bulk, or solution polymerization techniques. Among the solvents which can be used as media in the solution polymerizations and as application solvents are trichlorofluoromethane, 1,1,2-trichloro-1,2,2-trifluoroethane, benzene, benzotrifluoride, xylene hexafluoride, and 1,1,1-trichloroethane. The solvent must be capable of dissolving the copolymer, yet have little effect on the imaging chemicals present on the transparency film.

The preparation of these copolymers is exemplified by polymerizing the desired monomers dissolved in the selected organic solvent in the presence of a free-radical initiator. At least one fluorocarbon monomer must be employed. However, more than one fluorocarbon monomer may be used to form the copolymer. In fact, it has been discovered that it is preferable to use more than one fluorocarbon monomer to form the copolymer. Likewise, more than one hardness-imparting monomer may be used to form the copolymer. However, it is preferable to use the hardness-imparting monomer which results in the highest value of Sward hardness. Suitable free-radical initiators include organic peroxides, such as benzoyl peroxide, and t-butyl hydroperoxide and azo compounds, with 2,2′-azobisisobutyronitrile being preferred. Also included in the reaction mixture is a chain transfer agent. A suitable chain transfer agent is dodecylmercaptan. The polymerization is preferably carried out in an inert atmosphere at a temperature of 40° to 75° C. Conversions of at least 90 percent of monomers charged and as high as 99 percent or higher can be effected by carrying out the polymerization for a period of 24 hours.

Copolymers having a fluorine content ranging from 5 percent to 50 percent can function as good release coatings. As the fluorine content increases above 50 percent, the copolymer becomes soft and deforms at the imaging temperature (100° C.), scatters light in the image, and does not project uniform colored images. As the fluorine content decreases below 10 percent of the copolymer, the coated surface shows a greater tendency to pick off toner powder. Below a 5 percent level of fluorine in the copolymer, the coated surface becomes irregular in its ability to repel the toner powder.

The hardness of the copolymer is an important property. Soft polymers deform during the imaging step. This deformation leads to light scattering and black-appearing areas in the projected colored images. A copolymer made with butyl methacrylate and N-ethylperfluorooctylsulfonamidoethyl acrylate produces a coating which deforms and projects black areas in colored image when applied as a top coat over a color imaging film. A copolymer made with methyl methacrylate and N-ethylperfluorooctylsulfonamidoethyl acrylate produces a coating which projects clear colored images when applied as a topcoat over a color imaging film. The toner powder does not adhere to the film in either case. The butyl acrylate copolymer has a Sward hardness of 10; the methyl methacrylate copolymer has a Sward hardness of 58. The Sward hardness of the copolymer should be at least 40, and preferably over 50.

The copolymer may be coated upon the infrared imageable film or thermally imageable film by any of the techniques known in the art, such as, for example, knife coating, Mayer rod coating, curtain coating, and extrusion bar coating. The preferred method of coating is extrusion bar coating. The copolymer is coated over the side of the film bearing the imageable layer formulation, thus acting as a top coat. The copolymers of the present invention are applied to the surface of the imaging film by coating from an organic solvent. Cross-linked copolymers are not suitable for coating from a solvent since they will not dissolve in most organic solvents. High molecular weight copolymers dissolve slowly, but they provide better toner release and hardness properties than low molecular weight copolymers. Molecular weights in excess of 8,000 to 10,000 are required to provide good release from originals bearing electrostatic toner while yielding an image which projects clear colored images on the screen.

The coating thickness of the copolymer must be controlled to obtain optimum performance. Coating weights in excess of 1.076 $g/m^2$ tend to become soft and to deform upon exposure to heat. This deformation leads to irregularities in image areas, resulting in light scattering, which in turn produces dark spots in the projected image. The preferred range of coating weight is from about 0.108 $g/m^2$ to about 1.076 $g/m^2$. The most preferred range is from about 0.108 $g/m^2$ to about 0.538 $g/m^2$.

The following examples present specific illustrations of the present invention although it should be understood that the invention is not intended to be limited to specific details to be set forth therein.

EXAMPLE I

A fluoroaliphatic radical containing methacrylate copolymer was prepared as described below:

In a one-quart amber glass bottle was placed 153 g of a methyl isobutyl ketone solution containing 70 g of monomer prepared from equimolar amounts of the alcohol N-ethylperfluorooctylsulfonamidoethanol, the isocyanate 2,4-toluene diisocyanate, and the alcohol hydroxypropylmethacrylate and having the formula:

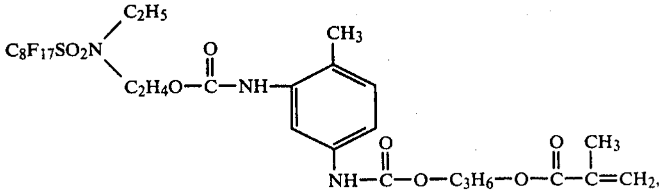

142.5 g of the monomer N-methylperfluorooctylsulfonamidoethyl acrylate having the formula

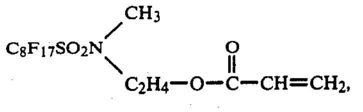

37.5 g of the monomer methyl methacrylate, 1.25 g of chain transfer agent dodecylmercaptan, 1.9 g of the initiator 2,2'-azobisisobutyronitrile and 580 g of 1,1,2-trichloro-1,2,2-trifluoroethane solvent (Freon 113, manufactured by E. I. duPont de Nemours and Co.). The bottle was purged with nitrogen, sealed, and tumbled in a water bath at 65° C. for 24 hours to yield a fluoroaliphatic radical containing copolymer solution. The copolymer solution was cooled to room temperature (25° C.) and was diluted to a 1% solids concentration with 1,1,1-trichloroethane. The solution was coated over the imageable layer of a sheet of infrared transparency film by means of knife coating. The coating density was 0.04 $gm/ft^2$ (0.430 $g/m^2$). The Sward hardness of this copolymer was 64.0.

In this and the following Examples, the infrared transparency film was 4 mil polyethylene terephthalate manufactured by Minnesota Mining and Manufacturing Company. The imageable layer formulation consisting of the following ingredients:

| | |
|---|---|
| Nickel nitrate | 0.0582 g |
| 3,7-Di(N,N—diethylamino)-10-benzoyl phenoxazine [Pergascript Turquoise S-2G from Ciba-Geigy] | 0.0859 g |
| Phthalic acid | 0.0500 g |
| 1-Phenyl-3-Pyrazolidinone | 0.0050 g |
| Catechol | 0.0136 g |
| Cellulose acetate butyrate | 1.5000 g |
| Ethanol | 1.7500 g |
| Tetrahydrofuran | 1.2500 g |
| Acetone | 7.2250 g |
| Methylisobutyl ketone | 1.2750 g |

Identical plain paper copies were employed as originals to measure toner adhesion in the infrared imaging process. The effectiveness of the fluorocarbon copolymer coating was measured by comparing image density measurements on treated and untreated film from the same lot of imaging film. The optical densities were measured on a MacBeth Model TD504AM densitometer. The images were made on a 3M Model 45 Infra Red Transparency Maker. Uncoated polyester film was used as a control. The results are set forth in Table I:

TABLE I

| SAMPLE | SOURCE OF ELECTRO-PHOTOGRAPHIC COPY | NUMBER OF SAMPLES AVERAGED | TREATED FILM OPTICAL DENSITY | TREATED FILM STANDARD DEVIATION | UNTREATED FILM OPTICAL DENSITY | UNTREATED FILM STANDARD DEVIATION | UNTREATED POLYESTER FILM OPTICAL DENSITY | UNTREATED POLYESTER FILM STANDARD DEVIATION |
|---|---|---|---|---|---|---|---|---|
| A | Printed | 15 | 1.16 ± 0.01 | 0.0223 | 1.16 ± 0.01 | 0.0229 | 0.00 | |
| B | 3M Secretary III | 15 | 1.18 ± 0.02 | 0.376 | 1.24 ± 0.04 | 0.652 | | |
| C | IBM III | 10 | 1.19 ± 0.01 | 0.0164 | 1.37 ± 0.07 | 0.995 | 0.21 ± 0.03 | 0.0413 |
| D | Kodak 150 | 10 | 1.25 ± 0.03 | 0.0411 | 1.35 ± 0.04 | 0.0566 | | |
| E | Sharpfax SF 811 | 10 | 1.21 ± 0.02 | 0.0221 | 1.49 ± 0.30 | 0.4158 | | |

Untreated infrared transparency film will remove more toner from an original, i.e., a plain paper copy bearing removable toner powder, than will a transparency film treated with the copolymer of the present invention. The toner which adheres to the untreated film will block light and thereby raise the transmission optical density readings. Untreated transparency film and treated transparency film should give the same optical density readings when the image is prepared from a printed original, i.e. an original having no removable toner, assuming that the films are selected from the same lot. This was indeed true (See Sample A, Table I). When untreated polyester film with no image receiving coating is used, only the base optical density of the film should be observed (See Sample A, Table I). If a plain paper copy original having removable toner is used to produce a transparency with untreated polyester film having no image receiving coating, an image resulting from removed toner can be observed and measured (See Sample C, Table I).

An infrared transparency film treated with an effective toner release coating should exhibit a lower optical density reading than an untreated transparency film from the same lot, solely due to the absence of adhering toner material on the treated film. This is shown to be true in Samples B,C,D, and E of Table I.

Furthermore, because toner deposition on the untreated film is not uniform, the standard deviation of the average image density readings should be greater for the untreated films than for the treated films (See Samples B,C, D, and E of Table I). However, standard deviations calculated for transparencies prepared from printed originals should be approximately the same for both treated and untreated films (See Sample A, Table I).

EXAMPLE II

The procedure for preparing the copolymer disclosed in Example I was repeated, with the only exception being that styrene was used in place of methyl methacrylate.

The copolymer was dissolved in 1,1,1-trichloroethane to form a solution containing 1.25% solids. The solution was coated over the imageable layer of a sheet of infrared transparency film by means of an extrusion bar coater. The film was the same type as that employed in Example I. The coating had a 2 mil wet thickness and was dried at 150° F. for three minutes. The Sward hardness of this copolymer was 74.0.

The effectiveness of the fluorocarbon copolymer coating was measured by comparing image density measurements on treated and untreated film from the same lot of imaging film. The images were made on a 3M Model 45 Infra Red Transparency Maker. Plain paper copies which served as originals were made on a 3M Secretary III Copier. The results are set forth in Table II:

TABLE II

| SAMPLE | SOURCE OF ELECTRO-PHOTOGRAPHIC COPY | TREATED FILM OPTICAL DENSITY | TREATED FILM STANDARD DEVIATION | UNTREATED FILM OPTICAL DENSITY | UNTREATED FILM STANDARD DEVIATION |
|---|---|---|---|---|---|
| F | Printed | | | 1.14 | 0.02 |
| G | 3 M Secretary III | 1.12 | 0.08 | 1.30 | 0.05 |

EXAMPLE III

The procedure for preparing the copolymer disclosed in Example I was repeated, with the only exception being that acrylonitrile was used in place of methyl methacrylate.

The copolymer was dissolved in a solvent containing 50% tetrahydrofuran and 50% 1,1,1 trichloroethane to form a solution containing 1.25% solids. The solution was coated over the imageable layer of a sheet of infrared transparency film by means of a knife coater. The film was the same type as that employed in Example I. The coating had a 2 mil wet thickness and was dried at 150° F. for three minutes. The Sward hardness of this copolymer was 35.5.

The effectiveness of the fluorocarbon copolymer coating was measured by comparing image density measurements on treated and untreated film from the same lot of imaging film. The images were made on a 3M Model 45 Infra Red Transparency Maker. Plain paper copies which served as originals were made on a 3M Secretary III Copier. The results are set forth in Table III:

TABLE III

| SAMPLE | SOURCE OF ELECTRO-PHOTOGRAPHIC COPY | TREATED FILM OPTICAL DENSITY | TREATED FILM STANDARD DEVIATION | UNTREATED FILM OPTICAL DENSITY | UNTREATED FILM STANDARD DEVIATION |
|---|---|---|---|---|---|
| H | Printed | | | 1.22 | 0.08 |
| I | 3 M Secretary III | 1.23 | 0.06 | 1.37 | 0.06 |

EXAMPLE IV

The procedure for preparing the copolymer disclosed in Example I was repeated with the only exception being that n-butyl methacrylate was used in place of methyl methacrylate.

Six grams of a 40% solution of the fluorocarbon terpolymer was diluted to 48.0 g with methyl ethyl ketone to make a 5% solution. This solution was knife coated using a 0.506 mm wet thickness on the imageable layer of single sheet color infrared imaging film of the same type as that employed in Example I. The Sward hardness of this copolymer was 35.6. The system was dried at 49° C. for 3 minutes and imaged on a 3M Model 45 transparency maker using an original from a 3M Secretary III plain paper copier. While the toner did not adhere to the transparency, a texture was imparted to the top coat which scattered light. Thus, although the image density as measured on a MacBeth Model 504AM densitometer was nearly the same as that obtained from a printed original, the projected appearance was mottled as though there were toner adhering to the transparency. Furthermore, this polymer was easily scratched and abraded during contact with the overhead projector stage on other pieces of film. Clearly this material was too soft for practical application.

What is claimed is:

1. Film for preparing transparencies by means of infrared imaging or thermal imaging, said film bearing an imageable layer having a top coat consisting essentially of a copolymer formed from (a) at least one fluorocarbon monomer selected from the group consisting of fluoroaliphatic acrylates and fluoroaliphatic methacrylates, and (b) at least one monomer which imparts hardness to the copolymer.

2. The film of claim 1 wherein said fluorocarbon monomer or monomers comprises from about 12 to about 85 percent by weight of the copolymer and said monomer or monomers which imparts hardness to the copolymer comprises from about 15 to about 88 percent by weight of the copolymer.

3. The film of claim 1 wherein the hardness imparting monomer or monomers is selected from the group consisting of styrene, α-methyl styrene, β-methyl styrene, acrylonitrile, methacrylonitrile, acrylamide, methacrylamide, methyl methacrylate, ethyl methacrylate, methyl acrylate.

4. The film of claim 1 wherein the coating has a Sward hardness of at least about 40.

5. The film of claim 1 wherein said fluorocarbon monomer or monomers is represented by the formula

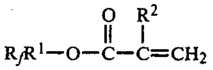

wherein $R_f$ is a perfluoroalkyl group containing 3 to 20 carbon atoms, $R^1$ is an alkylene bridging group containing 1 to 16 carbon atoms, and $R^2$ is —H or —$CH_3$.

6. The film of claim 1 wherein said fluorocarbon monomer or monomers is represented by the formula

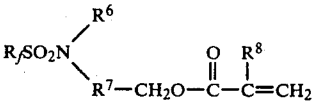

wherein $R_f$ is a perfluoroalkyl group containing 3 to 20 carbon atoms, $R^6$ is an alkyl side group containing 1 to 6 carbon atoms, $R^7$ is an alkylene bridging group containing 1 to 16 carbon atoms, and $R^8$ is —H or —$CH_3$.

7. The film of claim 6 wherein said fluorocarbon monomer or monomers is a mixture of

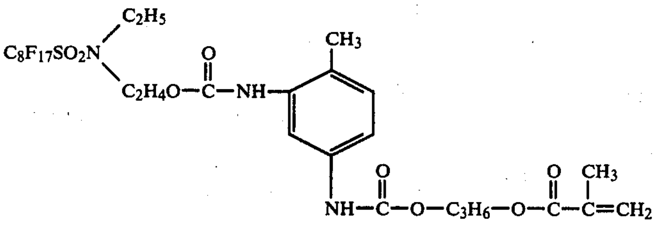

and

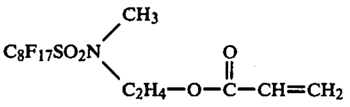

8. Method of preparing a transparency by means of infrared imaging or thermal imaging, said transparency being produced from the film of claim 1.

* * * * *